United States Patent [19]
Imura

[11] Patent Number: 6,029,009
[45] Date of Patent: *Feb. 22, 2000

[54] MOTION COMPENSATION OPTICAL DEVICE HAVING IMPROVED CLAMP STRUCTURE

[75] Inventor: Yoshio Imura, Kawasaki, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/693,599

[22] Filed: Aug. 5, 1996

[30] Foreign Application Priority Data

Aug. 4, 1995 [JP] Japan .................................. 7-199715

[51] Int. Cl.[7] .................................................. G03B 17/00
[52] U.S. Cl. .............................................................. 396/55
[58] Field of Search ................................. 396/52, 53, 54, 396/55, 421; 348/208; 359/554

[56] References Cited

U.S. PATENT DOCUMENTS

| | | | |
|---|---|---|---|
| 5,041,852 | 8/1991 | Misawa et al. | 354/76 |
| 5,117,246 | 5/1992 | Takahashi et al. | 354/202 |
| 5,153,633 | 10/1992 | Otani | 354/430 |
| 5,181,056 | 1/1993 | Noguchi et al. | 354/70 |
| 5,266,988 | 11/1993 | Washisu | 354/70 |
| 5,305,040 | 4/1994 | Enomoto | 354/202 |
| 5,335,032 | 8/1994 | Onuki et al. | 354/195.1 |
| 5,416,558 | 5/1995 | Katayama et al. | 354/446 |
| 5,444,512 | 8/1995 | Morizumi | 354/430 |
| 5,619,735 | 4/1997 | Kai | 396/55 |
| 5,623,326 | 4/1997 | Okano | 396/55 |
| 5,659,808 | 8/1997 | Okada | 396/55 |
| 5,842,052 | 11/1998 | Okano | 396/55 |

*Primary Examiner*—Safet Metjahic
*Assistant Examiner*—Christopher E. Mahoney

[57] ABSTRACT

An optical motion compensation device that quickly releases the locking of a motion compensation optical system when it is desired to effect motion compensation, and that reliably locks the motion compensation optical system when not effecting motion compensation. The device includes a motion compensation optical system to move so as to compensate for motion. Also, the device includes an optical system support device to movably support the motion compensation optical system. An optical system drive device drives the motion compensation optical system in a direction to compensate for motion caused by external factors, such as hand shaking. An optical system movement device, distinct from the optical system drive device, causes the motion compensation optical system to move to a predetermined location. An optical system holding device maintains the motion compensation optical system, which has moved to the predetermined location, in that location, and a clamp control system, directly before commencing driving of the motion compensation optical system by the optical system drive device, cancels holding of the optical system holding device, and after the driving has stopped, moves the motion compensation optical system to a predetermined position by the optical system movement device, to maintain the motion compensation optical system in this location by the optical system holding device.

12 Claims, 8 Drawing Sheets

MOTION COMPENSATION OPTICAL DEVICE HAVING IMPROVED CLAMP STRUCTURE

CROSS REFERENCE TO RELATED APPLICATIONS

This application is based upon and claims priority from Japanese Patent Application No. 07-199715 filed Aug. 4, 1995, the contents of which are incorporated herein by reference.

BACKGROUND OF THE INVENTION

1. Field of the Invention

The present invention relates to a motion compensation device which compensates for blur in an image in optical systems, instruments and the like. In particular, the present invention relates to a motion compensation device with an improved clamp structure for the motion compensation optical system.

2. Description of the Related Art

Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

Heretofore, in this kind of motion compensation device, for example, it is known to provide a locking mechanism wherein a conical depression is disposed in the lens holding frame which holds the compensation lens. By linearly moving a conical convex member in a direction parallel to the optical axis and by tightly pressing the conical convex member into the conical depression so as to engage in a state where the center lines of the concave and convex cones coincide, it is possible to control the movement in two mutually perpendicular directions, which are at right angles to the optical axis of the lens holding frame. Further, the compensation lens is now in a locked state. Such a structure for this motion compensation device is disclosed in Japanese Laid Open Patent Publication 6-67274.

However, because engagement was caused by the roughness of the cones in the optical axis direction, in the case of commencing motion compensation, in order to drive the motion compensation optical system to release this engagement, a time lag arose in the prior art motion compensation device.

Moreover, when not performing motion compensation, because the concave and convex portions of the cones lock due to movement in the optical axis direction, in the case that the compensation lens is not in a predetermined position, e.g., centered, a reliable lock was not possible.

SUMMARY OF THE INVENTION

Accordingly, it is an object of the present invention to provide a motion compensation device which performs reliable locking of the motion compensation optical system when not compensating for motion.

Furthermore, it is another object of the present invention to quickly release the locking of the motion compensation optical system when it is desired to compensate for motion.

Objects of the present invention are attained by using a motion compensation device comprising a motion compensation optical system to move so as to compensate for motion, an optical system support device to movably support the motion compensation optical system, an optical system drive device to drive the motion compensation optical system in a direction to compensate for motion, an optical system movement device, distinct from the optical system drive device, to cause the motion compensation optical system to move to a predetermined location, an optical system holding device to maintain the motion compensation optical system, which has moved to the predetermined location, in that location; and a clamp control system which, directly before commencing driving of the motion compensation optical system by the optical system drive device, cancels holding of the optical system holding device, and after the driving has stopped, moves the motion compensation optical system to a predetermined position by the optical system movement device, to maintain the motion compensation optical system in this location by the optical system holding device.

The motion compensation device, in accordance with the present invention, may further include a commencement signal generation device to generate a commencement signal which begins the drive of the motion compensation optical system by the optical system drive device. The clamp control device, when the commencement signal is generated, releases the hold of the optical system holding device, and when the commencement signal is not generated, moves the motion compensation optical system to the predetermined position using the optical system movement device.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
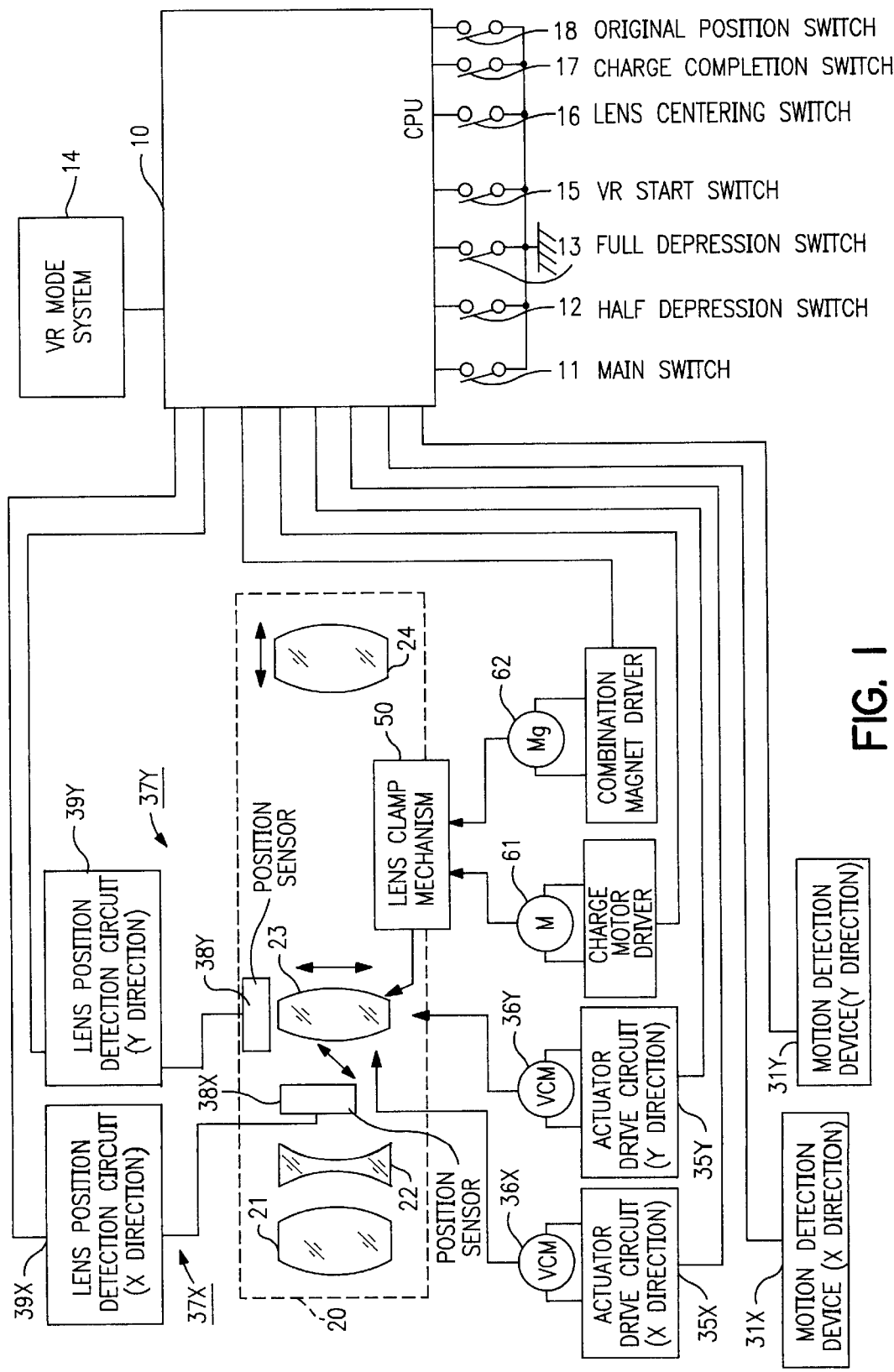
FIG. 1 is a block diagram showing a first preferred embodiment of a motion compensation device according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a preferred embodiment of a motion compensation device according to the present invention particularly suitable for a camera, and FIG. 2 is a diagram showing the support structure of a motion compensation optical system of a motion compensation device according to this embodiment.

CPU 10 is a processing device for controlling rangefinding, photometry, and the like photographic functions of a camera, and in addition performs control of the motion compensation function. Signals are connected from a main switch 11, half depression switch 12, full depression switch 13, VR (Vibration Reduction) mode switch 14, VR start switch 15, lens centering switch 16, charge completion switch 17, original position switch 18, and motion detection devices 31X, 31Y which contain acceleration sensors and the like.

A photographic lens unit 20, enclosed by a broken line in FIG. 1, includes lenses 21, 22, a motion compensation lens 23, and a focusing lens 24. The motion compensation lens 23 compensates for motion, bringing about changes of the optical axis of the photographic lens, and is supported to be capable of movement in the X axis and Y axis directions.

Figure 2A:
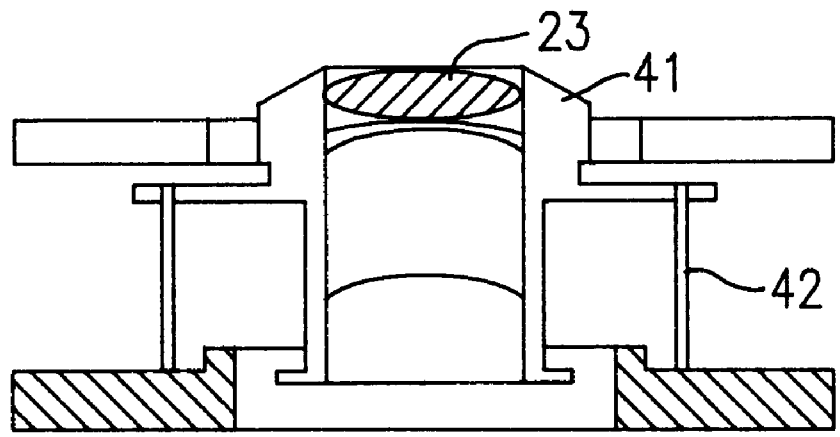
FIGS. 2(A) and 2(B) are cross-sectional views showing the support structure of the motion compensation optical system in a preferred embodiment of the present invention.
Figure 2B:
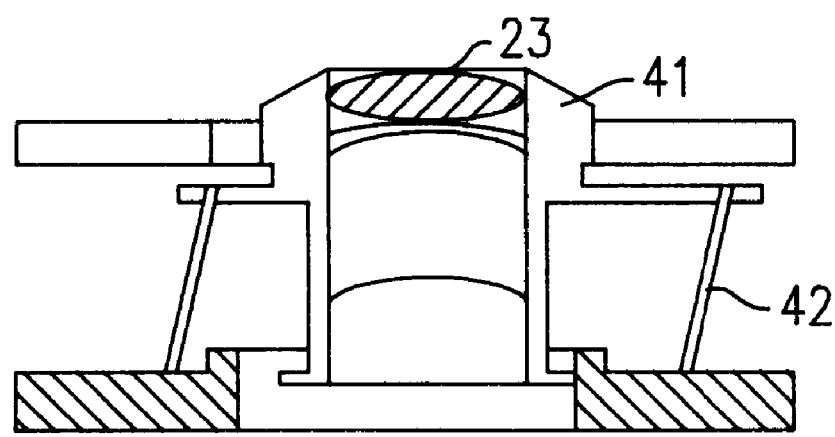

The motion compensation lens 23, as shown in FIGS. 2(A) and 2(B), is supported in a motion compensation lens barrel 41. The motion compensation lens barrel 41 is resiliently supported in a cantilevered manner, such as by four flexible support rods 42, and can move in directions at right angles with respect to the optical axis.

The motion compensation lens 23 is driven in the X direction or the Y direction, such as by a voice coil and the like actuators 36X, 36Y (VCM) via actuator drive circuits 35X, 35Y, based on motion compensation control signals from the CPU 10.

Position detection devices 37X and 37Y, in order to detect the position of the motion compensation lens 23, have outputs from position sensors 38X, 38Y respectively connected to the CPU 10 via lens position detection circuits 39X, 39Y.

Figure 3:
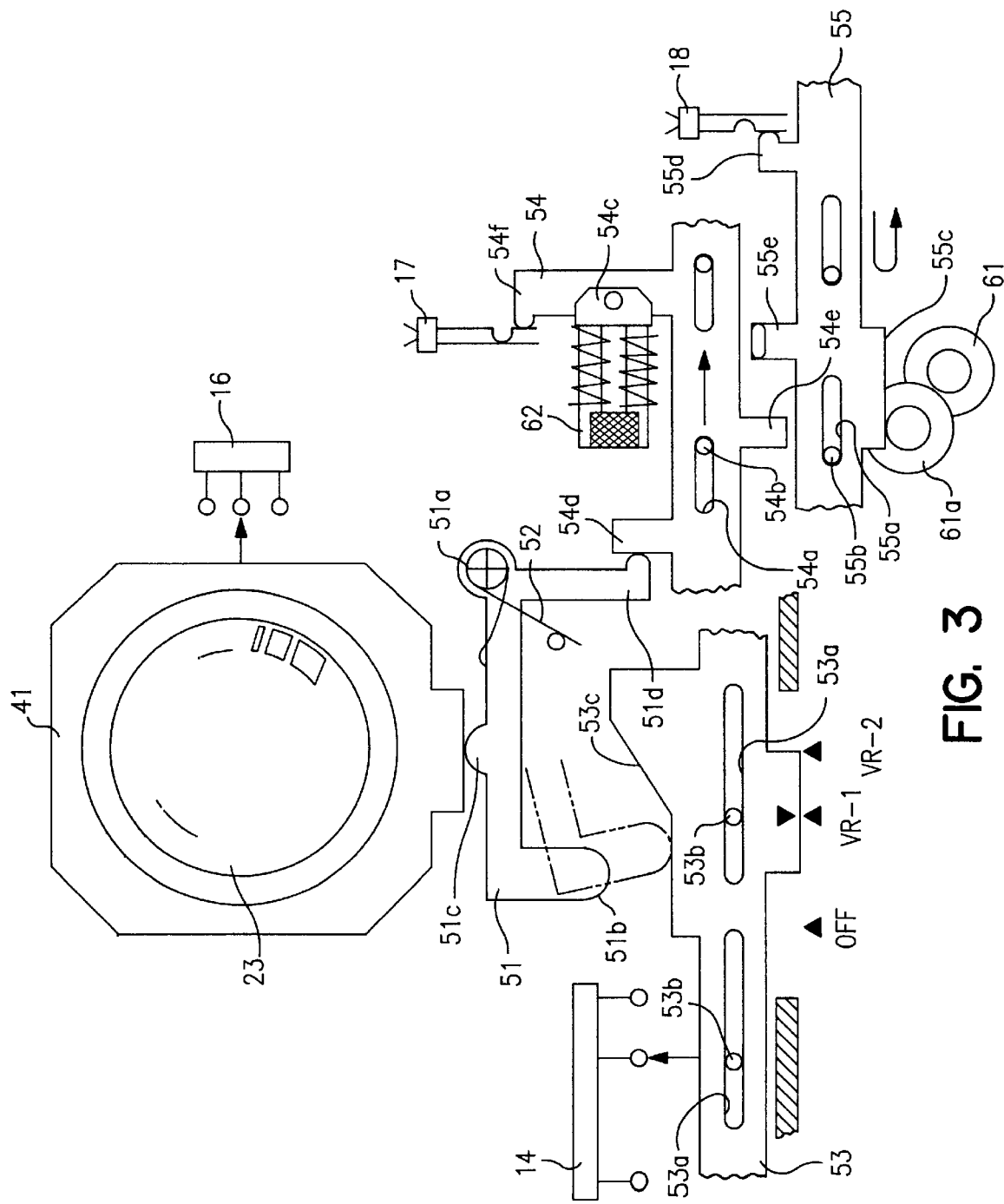
FIG. 3 is a schematic diagram describing the operation of a clamp device in the first embodiment of the motion compensation device.
Figure 4:
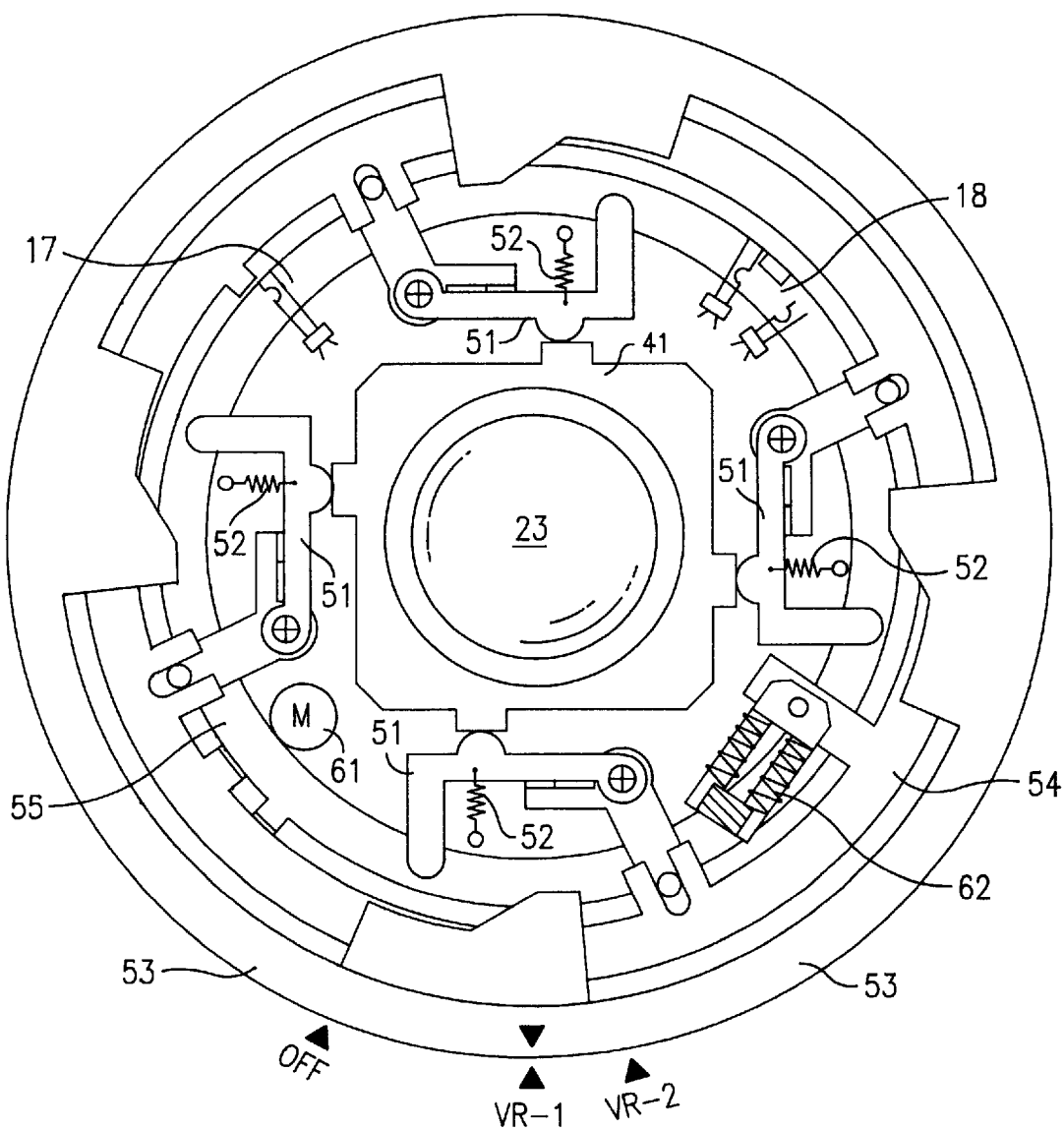
FIG. 4 is a diagram illustrating an inserted state of the clamp device in a lens barrel according to the first embodiment of the motion compensation device.

FIGS. 3 and 4 are diagrams showing a clamp device for the motion compensation device according to the preferred embodiment. FIG. 3 is a schematic diagram in order to describe the operation, and FIG. 4 shows the state where the clamp device is inserted into a lens barrel.

A locking lever 51 is disposed so as to be freely rotatable around a shaft 51a acting as the center, and is urged in the counter-clockwise direction in FIG. 3 by a spring 52. The locking lever 51 is formed with a key portion 51b, a projection portion 51c, and a leg portion 51d. The projection portion 51c can come into engagement with the motion compensation lens barrel 41. The clamp device also includes a lens clamp mechanism 50.

Switch 16 is a lens centering switch which detects that the motion compensation lens barrel 41 is in a centered position.

A hand operated actuation member 53 is an actuation member for setting the VR mode. It is possible to set the VR mode to "OFF" when VR control is not performed, to "VR1" half depression mode which performs VR control at a time of half depression, and to "VR2" mode which performs VR control at a time of full depression. The hand operated actuation member 53 is slidably supported. A slotted hole 53a is guided by a pin 53b.

A VR mode switch 14 changes over the mode by sliding operation of the hand operated actuation member 53. The hand operated actuation member 53 is formed with an inclined portion 53c, which comes into contact with the key portion 51b of the locking lever 51.

A stop member 54 is a member that stops the locking lever 51 in the locking position, and is slidably supported, guided by a pin 54b in a slotted hole 54a. This stop member 54 is formed with projection portions 54d, 54e, and a leg portion 54f.

A combination magnet 62 is a magnet assembled from a permanent magnet and an electromagnet. When no current flows to the electromagnet, the attractive force of the permanent magnet operates, and attracts an attraction portion 54c of the stop member 54. When a current flows, the attractive forces of the two magnets cancel, and no attractive force operates.

Moreover, the projection portion 54d can come into engagement with the leg portion 51d of the locking lever 51. It is possible for the projection portion 54e, as described later, to come into engagement with a projection portion 55e of a charging lever 55.

Switch 17 is a charge completion switch which detects whether or not charging has been completed, and is in engagement with the leg portion 54f of the stop member 54 and, when detecting the left-hand slide end of the stop member 54, is set ON. That is, the charge completion switch 17 is turned on by leg portion 54f as attraction portion 54c is attracted to the combination magnet 62, when the stop member slides to the left edge towards the position shown in FIG. 3. By having charge completion switch 17 turned ON, this state detects that stop member 54 is attracted by combination magnet 62.

The charging lever 55 is a member in order to return the stop member 54 to a position where attraction is possible by the combination magnet 62. Stop member 54 is slidably supported, such as by the slotted hole 54a being guided by a pin 54b.

The charging lever 55 comprises a rack 55c in engagement with an output gear 61a of a charge motor 61, a projection portion 55d for switching the original position switch 18 ON/OFF, projection portion 55e in engagement with the stop member 54, and the like. Charging lever 55 is slidably supported, a slotted hole 55a being guided by a pin 55b.

The original position switch 18 is a switch which detects that the charging lever 55 is in the original position and, when detecting the right-hand slide end of the charge member 55, is set ON. That is, the original position switch 18 is turned ON by projection portion 55d when the charge member 55 slides to the right edge as shown in FIG. 3. By having the original position switch 18 turned ON, this state detects that charge member 55 is in its original position.

When the hand operated actuation member 53 is in the OFF position, the motion compensation lens barrel 41 is in the shift regulated center position, because the inclined portion 53c presses the locking lever 51 up.

When the hand operated actuation member 53 is caused to move to the VR1 or VR2 position, the locking lever 51 becomes movable in the counter-clockwise direction in FIG. 3. Because the stop member 54 stops the leg portion 51d of the other end of locking lever 51, the motion compensation lens barrel 41 is held in the centered position. At this time, the motion compensation lens barrel 41 is held in the centered position by a force of about 10 g, and is given by the expression (attraction force of combination magnet 62–urging force of spring 52).

Directly before performing motion compensation control, and upon cancelling the attraction of the combination magnet 62, the locking lever 51, due to the urging force of the spring 52, moves away in the counter-clockwise direction in FIG. 3, and the state of the motion compensation lens barrel 41 becomes one in which it can freely move.

When motion compensation control ends, by the rotation of the charge motor 61, the charging lever 55 slides to the left, and the attraction portion 54c of the stop member 54 maintains attraction because it is close to the combination magnet 62, and pushes the locking lever 51 against the motion compensation lens barrel 41, and after this returns to the original position.

When the VR mode switch 14 is set ON, the locking lever 51, in the escaped state, sets the power supply OFF, actuating the hand operated actuation member 53, with the motion compensation lens barrel 41 returning to the centered position, and it can be held there. When either of VR-1 or VR-2 is selected for the VR mode using manual operating member 53, and VR mode switch 14 is connected to either of VR-1 or VR-2 on the right side of FIG. 3, inclined portion 53c is in the position where key portion 51b of locking lever 51 is retracted. In this condition, for example, if attraction portion 54c of stop member 54 is released from combination magnet 62 due to some undetermined occurrence causing an impact while the electrical power source is not supplied because the power source, i.e. the battery, (not shown in figures) is either depleted or has been removed, the motion compensation lens barrel 41 can no longer be maintained in the center position. Even in such a case, inclined portion 53c pushes up locking lever 51 be sliding manual operating member 53 to the OFF position, thereby enabling maintenance of the motion compensation lens barrel 41 in the center position.

FIG. 4 shows the state of the clamp device of FIG. 3 inserted into the motion compensation lens barrel. In this Figure, the same symbols are used for members which perform the same function as in FIG. 3 though somewhat different in configuration. In the structure for the motion compensation device of FIG. 4, four clamp devices are disposed around the motion compensation lens barrel 41. The hand operated actuation member 53, the stop member 54, and the charging lever 55 are members of annular form. Moreover, the locking lever 51 and spring 52 are slightly different in configuration than those depicted in FIG. 3, but operate the same.

FIGS. 5(A)–8 are flow charts which describe the operational steps of the CPU of the motion compensation device of the preferred embodiment of the present invention.

The operational flow starts by setting the main switch 11 ON. By half depression of the release button, when the half depression switch 12 is set ON (S101), the angular velocity sensor is set ON and motion detection commences (S102). The subroutine of the photographic preparation process is carried out (S103).

Figure 6:
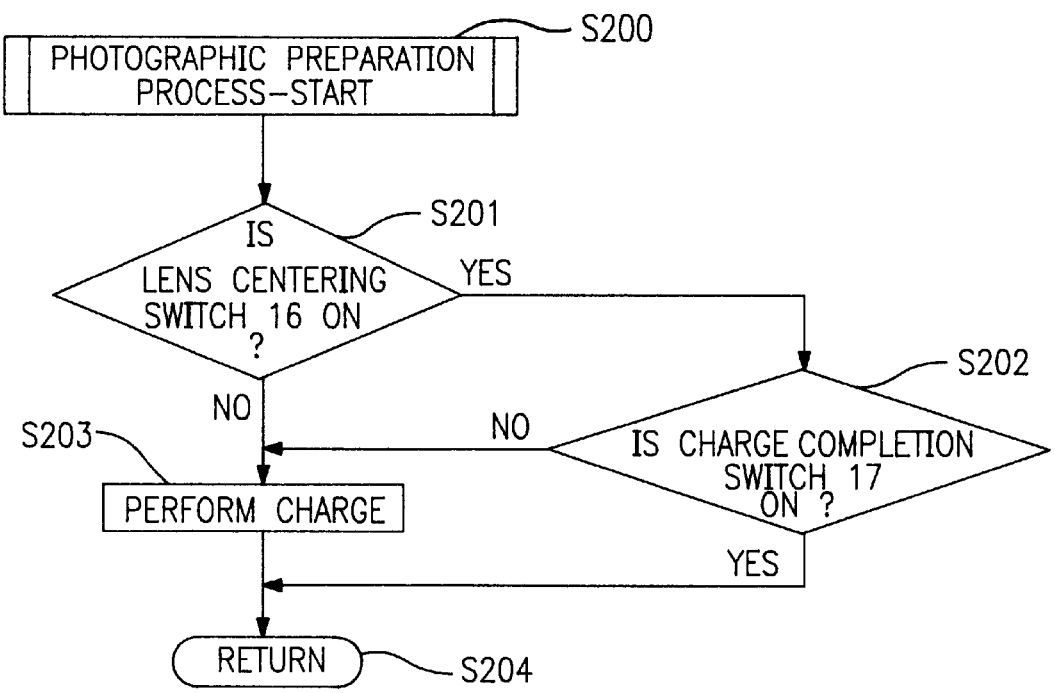
FIG. 6 is a flow chart showing a subroutine of a photographic preparation process performed by the CPU in the first embodiment of the motion compensation device.

This subroutine of the photographic preparation process (S200), as shown in FIG. 6, determines whether or not the lens centering switch 16 is ON (S201). When lens centering switch 16 is ON, the CPU determines whether the charge completion switch 17 is ON (S202).

In the case that the centering switch 16 is OFF or the charge completion switch 17 is OFF, the charge motor 61 is caused to rotate, and after the charge has been performed (S203), returns (S204).

Returning to FIG. 5(A), the CPU next determines whether the half depression switch 12 is ON (S104). When switch 12 is ON, the CPU determines whether the VR mode switch 14 is ON (S105).

In the case that the VR mode switch 14 is ON, the CPU determines whether half depression VR mode VR1 (S106) is ON.

In the case that it is the half depression VR mode, i.e., VR1 is ON, the CPU determines whether the VR start switch 15 is ON (S107). When switch 15 is ON, the subroutine of the lens clamp release process is carried out (S108).

Figure 7:
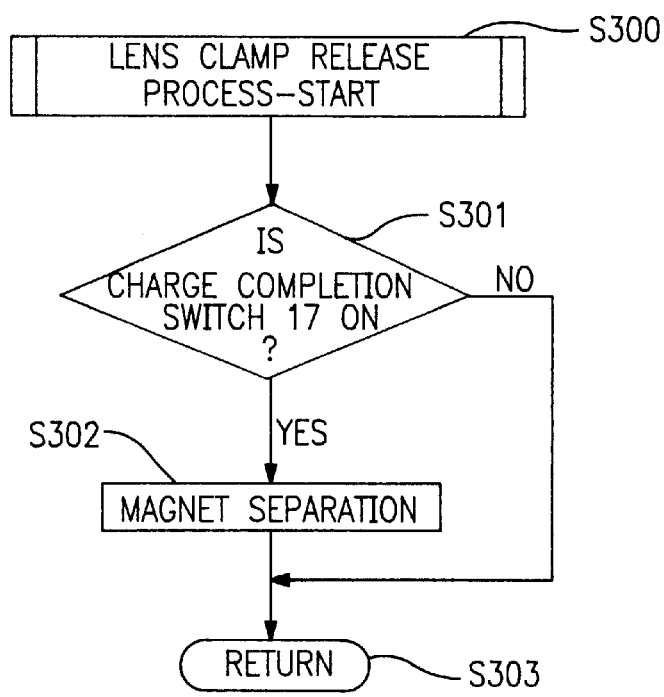
FIG. 7 is a flow chart showing a subroutine of a lens clamp release process performed by the CPU according to the first embodiment of the motion compensation device.

The subroutine of the lens clamp release process (S300), as shown in FIG. 7, determines whether the charge completion switch 17 is ON (S301). In the case that switch 17 is ON (charge is complete), current passes through the combination magnet 62, thus causing magnet separation (S302), and returns (S303).

Figure 5A:
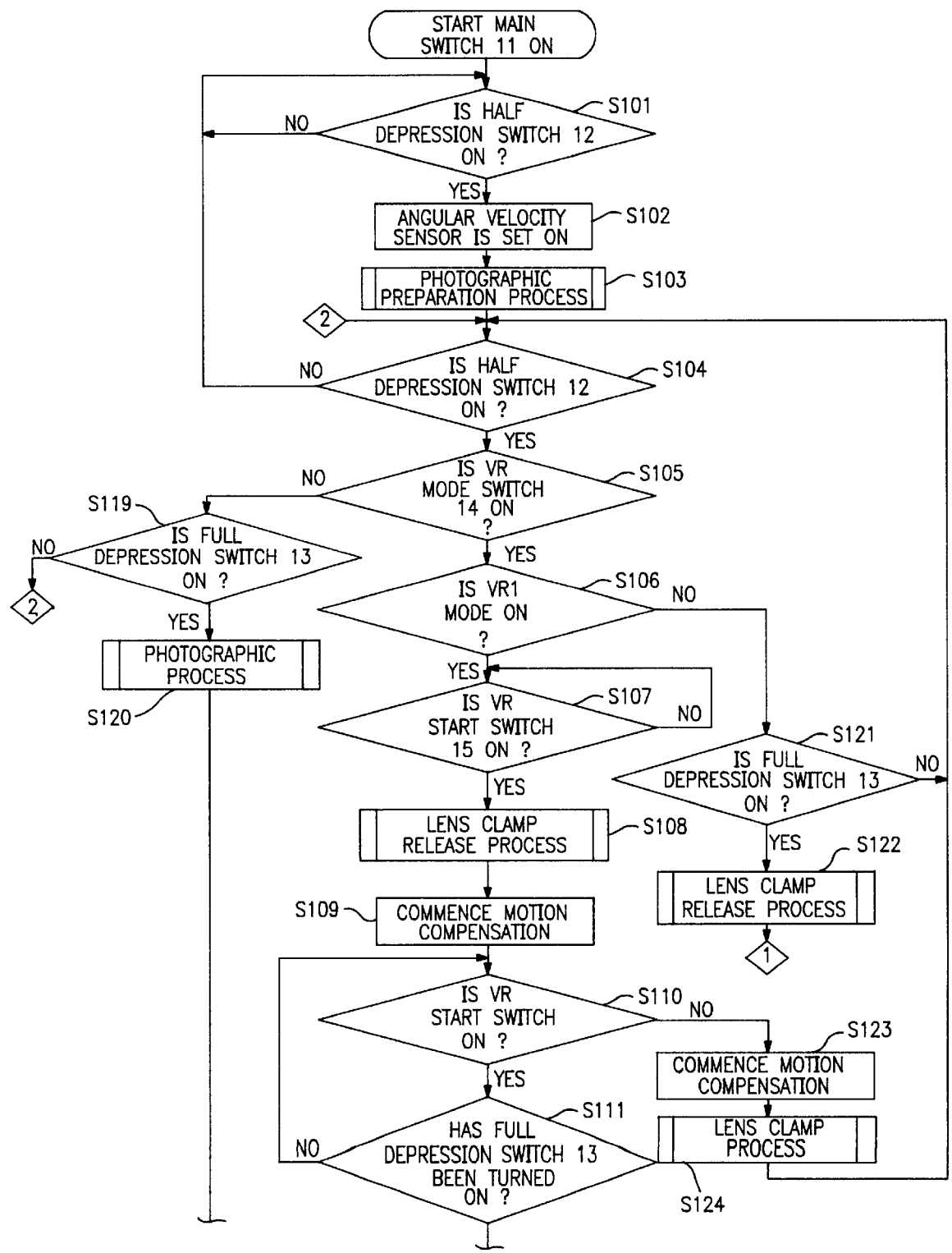
FIGS. 5(A) and 5(B) are a flow chart showing the main operational routine of a CPU for the first embodiment of the motion compensation device.
Figure 5B:
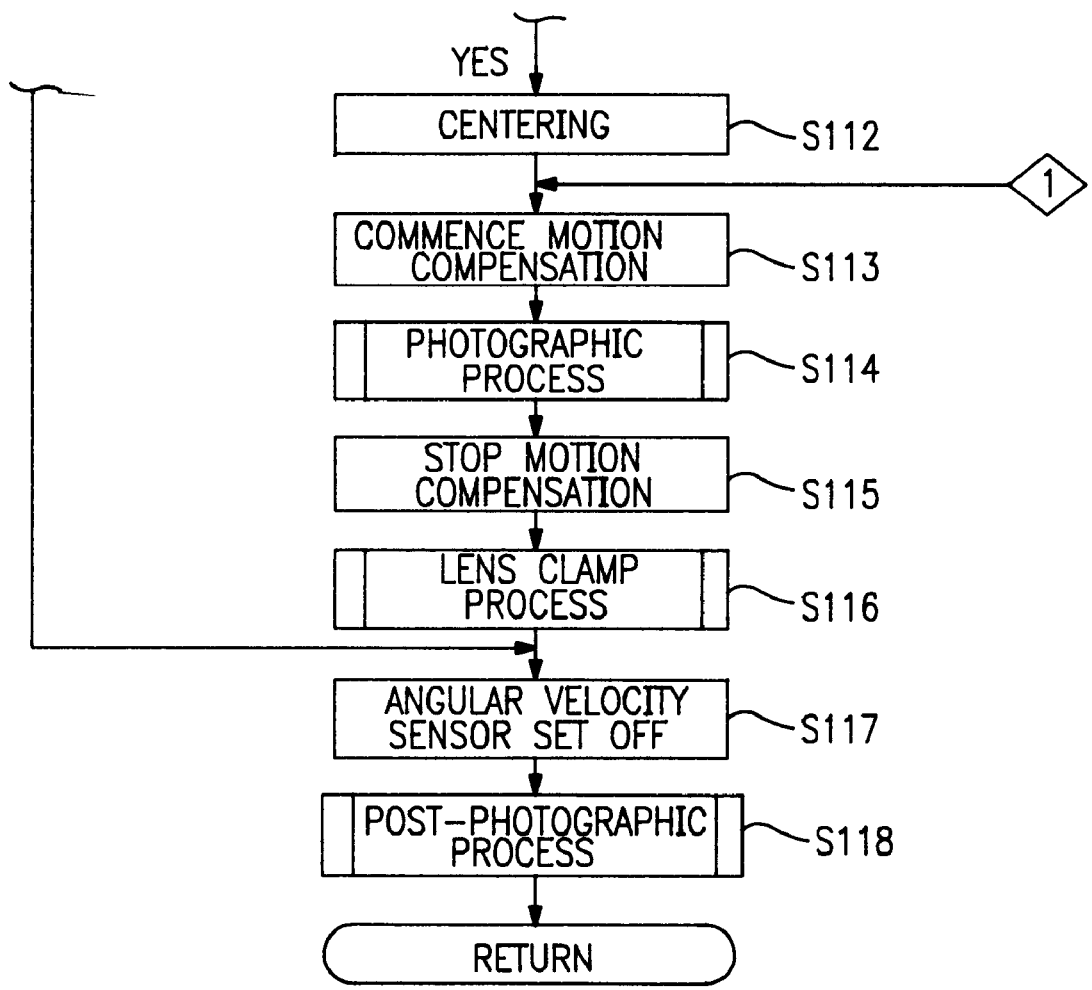

Returning once again to FIG. 5(A), commencing motion compensation (S109), the CPU determines whether the VR start switch 15 is ON (S110). In the case where switch 15 is ON, full depression of switch 13 is awaited, i.e., switch 13 is turned ON (S111). As shown in FIG. 5(B), which is a continuation of the flow chart of FIG. 5(A), after centering (S112), motion compensation is commenced (S113), and the subroutine of the photographic process is then carried out (S114).

A detailed description of this subroutine of the photographic process is omitted, as it is a well known photographic process.

When the subroutine of the photographic process is complete, motion compensation is stopped (S115), and the subroutine of the lens clamp process is carried out (S116).

Figure 8:
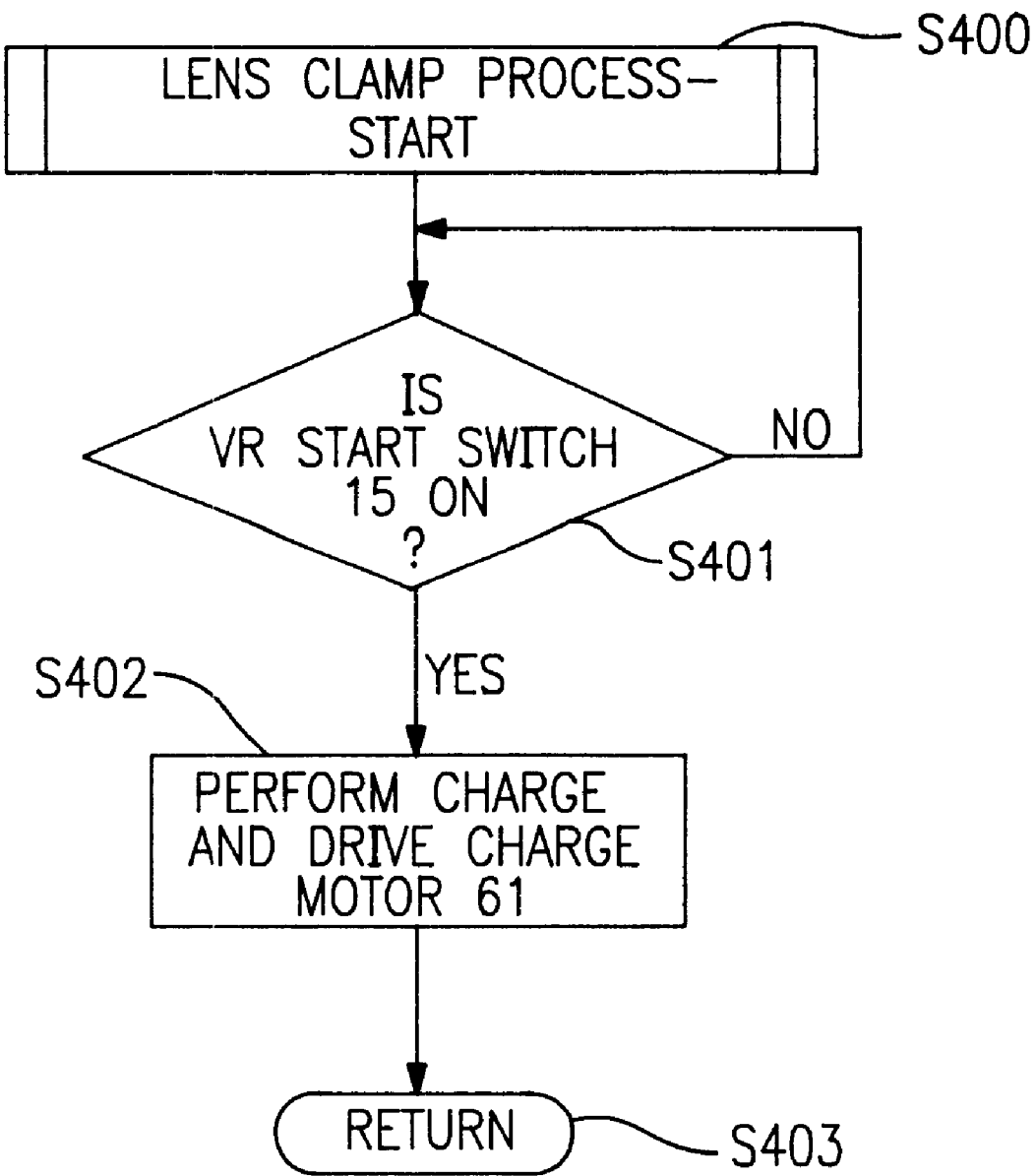
FIG. 8 is a flow chart showing a subroutine of the lens clamp process performed by the CPU according to the first embodiment of the motion compensation device.

The subroutine of the lens clamp process (S400), as shown in FIG. 8, determines whether the VR start switch 15 is ON (S401). When the VR start switch 15 is ON, the charge motor 61 is driven after a charge has been performed (S402), and then operation returns (S403).

Returning to FIG. 5(B), the angular velocity sensor than is set OFF (S117) and in addition, the subroutine of a post-photographic process is carried out (S118). A detailed description of this subroutine of the post-photographic process is omitted, as it is a well known process.

In step S105, in the case that the VR mode switch 14 is OFF, it is determined whether the full depression switch 13 is ON (S119). In the case where switch 13 is ON, after the subroutine of the photographic process has been carried out (S120) (same as step 114), the CPU continues with step S117.

In step S106, in the case that it was not in the half depression motion compensation mode (case of full depression motion compensation mode), the CPU determines whether the full depression switch 13 is ON (S121), and after the subroutine of the lens clamp release process (FIG. 7) has been carried out (S122), operation proceeds to step S113. In the case that the full depression switch 13 is OFF, the process returns to step S104.

In step S110, in the case that the VR start switch 15 is OFF, motion compensation is stopped, and after the subroutine of the lens clamp process (FIG. 8) has been carried out (S124), the process returns to step S104.

By means of the present invention as described hereinabove, motion compensation control is possible with practically no time lag, as directly before driving the motion compensation optical system, the holding of the optical system holding device is released.

Moreover, when the drive of the motion compensation optical system has stopped, the motion compensation optical system is moved to a predetermined position by the optical system movement device. This position is maintained by the optical system holding device. When not performing motion compensation, the motion compensation optical system can be reliably locked.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring an image formed by an optical system, for example, in camcorders, motion picture cameras, telescopes, binoculars, microscopes, range finding equipment, lasers, fiber optical communications systems, various optical projection systems and CD mastering systems.

What is claimed is:

1. A motion compensation device comprising:
   a compensation optical system to compensate for vibration;
   a mode-changing switch operable to between an ON and an OFF position to change the mode of operation of said motion compensating system; and
   a clamp mechanism mechanically connected to the mode-changing switch to hold the compensation optical system when the mode-changing switch is moved to the OFF position, said clamp mechanism including a single resilient lever arm to contact the compensation optical system, a slide mechanism responsive to a magnetic force and able to move the lever arm, and a second slide mechanism to select the operation mode of the motion compensation device.

2. A motion compensation device according to claim 1, further comprising:
   an optical system support device to movably support the compensation optical system.

3. A motion compensation device according to claim 2, further comprising:
   an optical system drive device to drive the optical system support device in a direction to compensate for motion.

4. A motion compensation device according to claim 3, further comprising:
   a commencement signal generation device to generate a commencement signal which commences the drive motion of the optical system support device by the optical system drive device.

5. A motion compensation device, comprising:
   a motion compensation optical system to move and thus compensate for motion;
   a mode-changing switch operable to between an ON and an OFF position to chance the mode of operation of said motion compensating system;
   an optical system support device to movably support the motion compensation optical system;
   an optical system drive device to drive the motion compensation optical system in a direction to compensate for motion; and
   an optical system locking device mechanically connected to the mode-changing switch to lock the optical system in position when the mode-changing switch is in the OFF position, said optical system locking device including
      a locking lever to interact with the optical system support device to lock the optical system support device in place;
      a stop member having an attraction unit to stop the locking lever in a locking position;
      a charging lever to return the stop member to a position where attraction is possible by said attraction unit of the stop member; and
      an actuation member to allow said locking lever to rotate in one of a clockwise and counterclockwise direction.

6. A motion compensation device as claimed in claim 5, wherein:
   said locking lever includes a center shaft about which said locking lever is rotatable, a key portion, and a projection portion that comes into engagement with the optical system support device.

7. A motion compensation device as claimed in claim 5, wherein said locking lever is urged to rotate by a spring.

8. A motion compensation device as claimed in claim 5, wherein:
   said stop member includes a pair of projecting portions, one of which engages said locking lever and the other engages said charging lever, and a leg portion, and
   said attraction unit is attractable to a combination magnet.

9. A motion compensation device as claimed in claim 8, wherein:
   said combination magnet operates in combination with a spring to stop said locking lever and to apply a force of approximately 10 g thereto.

10. A motion compensation device as claimed in claim 5, wherein:
    said charging lever includes a rack engaged with a charge motor and a projection portion engaging the stop member.

11. A motion compensation device, comprising:
    a compensation optical system to compensate for vibration;
    a mode-changing switch operable to between an ON and an OFF position to change a mode of operation of the motion compensation device; and
    a clamp mechanism mechanically connected to the mode-changing switch to hold the compensation optical system when the mode-changing switch is moved to the OFF position, the clamp mechanism including a slide mechanism responsive to a magnetic force and able to move the lever arm, and a second slide mechanism to select the mode of operation of the motion compensation device.

12. A motion compensation device, comprising:
    a compensation optical system to compensate for vibration;
    a mode-changing switch operable to between an ON and OFF position to change a mode of operation of the motion compensation device; and
    a clamp mechanism mechanically connected to the mode-changing switch to hold the compensation optical system when the mode-changing switch is moved to the OFF position.

* * * * *